United States Patent [19]

Lopker

[11] 4,059,674

[45] Nov. 22, 1977

[54] METHOD FOR MANUFACTURING PHOSPHORIC ACID AND GYPSUM

[75] Inventor: Edwin B. Lopker, Fort Lauderdale, Fla.

[73] Assignee: Pullman Incorporated, Chicago, Ill.

[21] Appl. No.: 272,788

[22] Filed: July 18, 1972

[51] Int. Cl.$^2$ .................. C01F 11/00; C01B 25/16; C01F 1/00
[52] U.S. Cl. .................................... 423/167; 423/320
[58] Field of Search .............................. 423/166–167, 423/317–321

[56] References Cited

U.S. PATENT DOCUMENTS

| 1,902,648 | 3/1931 | Larsson | 423/167 |
|---|---|---|---|
| 3,627,485 | 12/1971 | Hori et al. | 423/167 |
| 3,632,307 | 1/1972 | Van Es et al. | 423/167 |

FOREIGN PATENT DOCUMENTS

| 1,111,078 | 4/1968 | United Kingdom | 423/320 |

*Primary Examiner*—G. O. Peters
*Assistant Examiner*—Gregory A. Heller
*Attorney, Agent, or Firm*—Pullman Incorporated

[57] ABSTRACT

A method of producing wet process phosphoric acid comprises reacting, in a reactor system, calcium phosphate rock particles with a mixture of recycled phosphoric and sulfuric acids, preferably supplemented with added fresh sulfuric acid, to form additional phosphoric acid and calcium sulfate dihydrate (gypsum). The reactor environment is controlled so as to avoid appreciable coating of the rock particles with calcium sulfate. A gypsum slurry is withdrawn and product phosphoric acid is separated therefrom and withdrawn from the process. The gypsum may be washed with a dilute sulfuric acid wash solution which is then added to the reactor. The gypsum is passed to a first recrystallizer wherein sulfuric acid is introduced, and the gypsum is recrystallized to hemihydrate. A slurry of the hemihydrate is passed to a second recrystallizer, wherein water obtained as described below is added and the hemihydrate is recrystallized to gypsum. The liquid component of the recrystallized gypsum slurry is separated therefrom and is employed as the above mentioned dilute sulfuric acid wash solution with, preferably, a portion being diverted to the first recrystallizer to control the solids content thereof. The recrystallized gypsum is washed with water, which is then added to the second recrystallizer as described above, and the washed gypsum is removed from the process as by-product.

4 Claims, 4 Drawing Figures

METHOD FOR MANUFACTURING PHOSPHORIC ACID AND GYPSUM

The present invention relates to a method for the manufacture of phosphoric acid by the wet process, i.e., by the reaction of phosphate rock with recycled phosphoric acid and sulfuric acid to produce phosphoric acid and calcium sulfate by-product. As is well known, the overall chemical reaction (in simplified form) for the production of phosphoric acid from calcium phosphate rock is as follows:

$$Ca_3(PO_4)_2 + 3H_2SO_4 = 3CaSO_4 + 2H_3PO_4 \tag{1}$$

This overall reaction is generally described in two separate steps, the first being the formation of a solution of monocalcium phosphate by reaction of the phosphate rock with excess phosphoric acid, usually recycled from the process. This first step is shown as follows:

$$Ca_3(PO_4)_2 + 4H_3PO_4 + 3CaH_4(PO_4)_2 \tag{2}$$

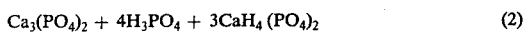

The monocalcium phosphate thus formed reacts with sulfuric acid to form additional phosphoric acid and calcium sulfate as follows:

$$3CaH_4(PO_4)_2 + 3H_2SO_4 + 3CaSO_4 + 6H_3PO_4 \tag{3}$$

While the basic reactions are simple and well understood, there are certain complicating factors. One of these is the fact that calcium phosphate rock occurs in nature usually as deposits of fluoapatite, $CaF_2.3\ CA_3(PO_4)_2$, contaminated to a greater or lesser extent with other minerals. Since such deposits are the commercial source of calcuim phosphate rock, the formation of numerous by-products occurs during the process, including fluorine-containing compounds and other by-products which constitute impurities in the phosphoric acid product. Such problems are not involved directly in the present invention and will not be further discussed herein, since both their existence and the methods and means of dealing with them are well known in the art.

Another complicating factor, one of more immediate concern in the practice of the present invention, is the several crystalline forms in which the calcium sulfate by-product may be obtained, depending on the concentration of the various reactants, and the temperature at which the reaction is carried out. The two forms of primary interest are calcium sulfate dihydrate, $CaSO_4.2H_2O$ and calcium sulfate hemihydrate, $CaSO_4.\frac{1}{2}H_2O$. Calcium sulfate anhydrite can also be formed under certain conditions.

Generally, calcium sulfate dihydrate (gypsum) is a stable crystalline form which, when formed in a suitable crystal shape, is readily filterable and washable in the process. Calcium sulfate hemihydrate on the other hand, has a tendency to hydrate on the filter to form an unfilterable mass, and accordingly, great care must be taken when hemihydrate cyrstals are being formed and filtered, in order to maintain conditions such that hydration of the hemihydrate does not take place, i.e., to insure that a filtration-stable hemihydrate crystal configuration is attained.

On the other hand, formation of calcium sulfate dihydrate crystals (hereinafter usually referred to simply as gypsum) tends to trap phosphate within its crystalline structure and thus results in a net loss of phosphate values from the system. In addition to being uneconomical by reducing the overall yield of phosphate from the phosphate rock, the resultant contamination of the gypsum by-product with phosphate values renders it unusable in the manufacture of building material, such as gypsum wall board, plaster, or cement.

This latter consideration, i.e., the purity of the by-product gypsum, is often of great importance in considering the economics of a given installation. Wet process phosphoric acid is produced in extremely large volume, and each day large quantities of by-product gypsum are produced from any given installation. Gypsum, if not otherwise usable results in a serious disposal problem. When plant installations are located near the sea, dumping in the ocean is often employed as the disposal method. Aside from the cost involved, increasing concern with the pollution of the environment in general, and the oceans in particular, militate against this method of disposal, paticularly since the gypsum is contaminated with phosphate values. Another alternative has been to simply dump the gypsum on open areas of land. However, aside from its pollution aspects, this renders the land virtually unusable since the extensive gypsum overburden thus formed does not provide a suitable footing to support structures or otherwise permit use of the dump-filled land.

Further, it is obvious that if economic credits can be obtained by converting the gypsum into a saleable product, the overall economics of a given phosphoric acid plant are greatly improved. As aforesaid, if of sufficient purity, the gypsum may be used in the manufacture of wall board, or plaster, or as a raw material for the manufacture of cement, with the sulfur dioxide by-product from the cement calcining step being used to produce sulfuric acid. However, if the gypsum is contaminated with phosphate values, it is not usable in the production of wall board, plaster or cement, since the presence of phosphate reduces considerably the mechanical strength of the construction material formed thereby.

Accordingly, it is an object of the present invention to provide a method for the production of phosphoric acid, wherein extraordinarily high yields of phosphoric acid are obtained and a pure by-product gypsum, suitable for use as a raw material in other processes, is obtained.

One problem associated with wet-process production of phosphoric acid is that of sufficiently washing the gypsum crystals provided, so as to both completely recover the product acid and sufficiently cleanse the gypsum crystals for byproduct use, without using quantities of wash water which will excessively dilute the product acid. This is a particular problem when the concentration of the phosphoric acid produced in the reactor system increases significantly above 33% $P_2O_5$. (As is customary in the art, the concentration of product phosphoric acid is expressed herein as (weight) percent $P_2O_5$, rather than as percent $H_3PO_4$.) At increasing concentration, the viscosity of the acid increases and it becomes increasingly more difficult to wash the product acid from the filter cake with the degree of thoroughness necessary. Accordingly, it is an object of the present invention to provide a method for producing phosphoric acid which includes a highly efficient technique for washing the gypsum which is withdrawn as a by-product of the process, all the wash water being employed on the final crystal product, and none being expended on the washing of intermediate crystal products.

The economy of a given wet process phosphoric acid process is largely dependent on the efficiency of overall phosphate value recovery, i.e., the minimization of phosphate losses. There are two basic types of phosphate losses inherent in the wet process method of producing phosphoric acid, and these are generally referred to as "insoluble" and "soluble" losses.

Insoluble losses include simply unreacted calcium phosphate, i.e., phosphate rock which is not completely reacted to yield its phosphate values, and which passes through the system as unreacted calcium phosphate rock. Certain naturally occurring rocks are more reactive than others. Depending on the degree of reactivity of the rock, it may have to be ground to a smaller particle size to insure reaction. However, assuming sufficient grinding suitable for the degree of reactivity normally exhibited by a given rock, one of the primary causes of unreacted phosphate rock (and a major cause of insoluble losses) is the coating of rock particles by calcium sulfate formed in the reaction, before the particle has had a chance to react. This coating or "blinding" of the rock particles is caused by excessive sulfate concentrations in the reactant mass, resulting in undue precipitation of calcium sulfate on the unreacted rock particles.

A second major cause of insoluble loss of phosphate values in the system is the entrapment of phosphate within the crystalline structure of calcium sulfate. As the calcium sulfate dihydrate, i.e., gypsum, crystallizes out, phosphate ions, believed to have the structure $HPO_4=$, substitute for sulfate ions, $SO_4=$, in the gypsum crystal structure, thus co-precipitating dicalcium phosphate ($CaHPO_4$) with calcium sulfate ($CaSO_4$) in the crystals.

The calcium sulfate thus formed contains dicalcium phosphate, which results in a loss of phosphate values from the system via entrapment in the by-product gypsum. This type of loss is sometimes referred to as a "lattice" loss, since the phosphate values are entrapped in a lattice of calcium sulfate crystals. It is known in the art to minimize lattice losses by maintaining an excess of sulfate ions in the phosphoric acid liquid from which the crystals are being precipitated. However, increasing the sulfate ion concentration of the phosphoric acid solution (usually by addition of sulfuric acid) to reduce phosphate lattice losses, can lead to excessive losses due to coating of phosphate rock particles as discussed above, and to excessive sulfate contamination of the phosphoric acid product.

"Soluble" losses generally refers to losses incurred by failure to completely wash residual phosphoric acid from the byproduct calcium sulfate crystals. Such retained residual phosphoric acid clinging to the surface of the by-product crystals is removed from the system with the by-product calcium sulfate, instead of being recovered in the re-cycled wash water.

In general, it is the objective of an economic wet phosphoric acid process to adjust conditions so that the sum total of the three basic types of phosphate losses (insoluble blinding and lattice losses and soluble losses), is minimized in order to attain the maximum overall rate of phosphate recovery.

In attempting to maximize overall phosphate yield rates, particularly in processes wherein it is desired to obtain a high purity by-product gypsum, several prior art schemes have been proposed including some in which calcium sulfate is precipitated as the hemihydrate or, at different stages of the process, as both gypsum and hemihydrate. Precipitation of calcium sulfate in the hemihydrate form appears to be based on the realization that while extensive lattice losses can be experienced in formation of gypsum, such losses do not seem to occur when hemihydrate or anhydrite calcium sulfate crystals are formed in the presence of phosphoric acid at not more than the usual 30–32% $P_2O_5$ product acid strength, since the dicalcium phosphate crystal does not "fit" into the hemihydrate or anhydrite crystalline lattice formed under such conditions. Prior art methods have attempted to take advantage of this phenomenon by reacting the phosphate rock to form the hemihydrate or anhydrite crystalline structure, with resultant elimination or minimization of lattice losses, and filtering the same to separate the product phosphoric acid therefrom. This has the great disadvantage, however, as stated above, of having to deal with the difficulty filterable nature of hemihydrate crystals, and requires that extensive precautions be taken to maintain conditions such that the hemihydrate remains stable and does not hydrate on the filter with consequent loss of filtration ability. Further, if phoshoric acid of higher concentration than 30–32% is to be made, losses are sustained even though the hemihydrate or anhydrite crystal form is produced.

Even if the hemihydrate is maintained in a sufficiently stable condition to permit filtration and washing without hydration, such of the small hemihydrate crystals which may be carried into the filter piping and subsequent equipment will hydrate therein and cause scale build-up and plugging of such piping and equipment. Further, such so-called "stable" hemihydrate, after removal from the filter, will hydrate in handling and storage areas to form cement-like blocks of material which are difficult to deal with.

Such recrystallization prior art schemes generally suffer from one or more basic defects. Primary among these is the necessity in some of them to filter the hemihydrate with the attendant difficulties in filtration and washing. Another problem is the necessity in certain of the prior art processes for the washing of crystals produced at an intermediate stage of the process. The wash water used in the intermediate wash must be recycled to the process to conserve the acid washed from the crystals, which results in dilution of the product acid. In order to wash the final crystal by-product, both to recover acid values and to obtain a clean by-product crystal, additional wash water must be used and recycled. Such multiple crystallization, multiple wash processes suffer from the fact that although only the final wash serves to purify the crystal by-product, all the washes dilute the final product acid.

A related prior art shortcoming is the need in some processes to thoroughly wash intermediate process crystals because phosphoric acid values not recovered in such intermediate washes are lost to the system.

Yet another difficulty in certain of the prior art recrystallization processes, is the necessity of separately preparing, maintaining and transporting an inventory of seed crystals, which are used to initiate the re-crystallization reaction.

Accordingly, it is an object of this invention to provide a method for the manufacture of phosphoric acid by the wet process, which yields a pure gypsum by-product, which minimizes phosphate losses from the process, which avoids the necessity of filtering hemihydrate calcium sulfate, and which "forgives" incomplete or even omitted washing of intermediate stage crystals by permitting recovery of any residual phosphoric acid which adheres to such crystals after the intermediate washing.

In accordance with the present invention, there is provided a method of manufacturing phosphoric acid which comprises reacting calcium phosphate rock with a mixture of phosphoric acid and sulfuric acid in a reactor in which the sulfate concentration is controlled so as to preclude appreciable "blinding" of phosphate rock particles by the formation of a coating of calcium sulfate thereon, to yield phosphoric acid and phosphate-containing gypsum by-product, withdrawing from the reactor a slurry containing gypsum and separating product phosphoric acid therefrom, passing the gypsum to a first recrystallizer wherein the gypsum is recrystallized to hemihydrate, thereby releasing entrapped lattice phosphate values, passing the hemihydrate to a second, relatively high-sulfate, low-phosphate concentration recrystallizer wherein the hemihydrate is recrystallized to gypsum, separating the recrystallized gypsum from its liquid, washing the gypsum thus obtained, and withdrawing it as by-product gypsum.

The crystals in the recrystallizers are slurried in any suitable liquids. Preferably, the liquid separated from the final gypsum by-product is returned to the first recrystallizer, and the wash water used to wash the final gypsum by-product is returned to the second recrystallizer, the crystals contained therein forming a slurry of crystals in the respective liquids.

Recrystallization of gypsum to hemihydrate in the first recrystallizer is favored by any one or all of the following factors: increase in sulfuric acid concentration, in phosphoric acid concentration, and in temperature.

Preferably, recrystallization in the first recrystallizer is attained by introducing sulfuric acid therein, which not only increases the sulfuric acid concentration but, by virtue of the heat of dilution of the sulfuric acid in the slurry liquid, also increases the temperature of the slurry. The first recrystallizer may of course be heated by any other means, either alone or in addition to the heating obtained by sulfuric acid addition. Preferably concentrated sulfuric acid is employed.

Conversely, recrystallization of hemihydrate to gypsum in the second recrystallizer is favored by any one or more of the following factors: decrease in sulfuric acid concentration, in phosphoric acid concentration and in temperature. Preferably, recrystallization in the second recrystallizer is carried out by introducing water therein, which not only reduces the acid concentration, but cools the slurry since the water is usually provided at a lower temperature than the slurry which is introduced into the second recrystallizer. Naturally, cooling by any suitable means may be employed, either alone or in addition to the cooling obtained by addition of water.

Preferably, the wash water used to wash the recrystallized, by-product gypsum is added to the second recrystallizer.

As used in the claims, the term "recrystallizing" (the gypsum to hemihydrate and vice-versa) shall mean suitably increasing or decreasing one or more of the acid concentrations and temperature as described above, sufficiently to carry out the recrystallization by shifting conditions in the recrystallizers between hemihydrate and gypsum phases. FIG. 2, described hereinbelow, shows hemihydrate and gypsum phases at typical acid concentrations and temperatures.

In accordance with another aspect of the invention, the gypsum which is separated from the slurry withdrawn from the reactor may be washed with sulfuric acid to remove residual phosphoric acid from the gypsum crystals. This sulfuric acid washing is done prior to introducing the gypsum into the first recrystallizer, and the sulfuric acid solution separated from the recrystallized gypsum from the second recrystallizer is used as the acid wash.

The invention will be more fully explained in the following detailed discussion thereof, including a description of a preferred embodiment of the invention, and illustrated in the attached drawings wherein.

Figure 1:
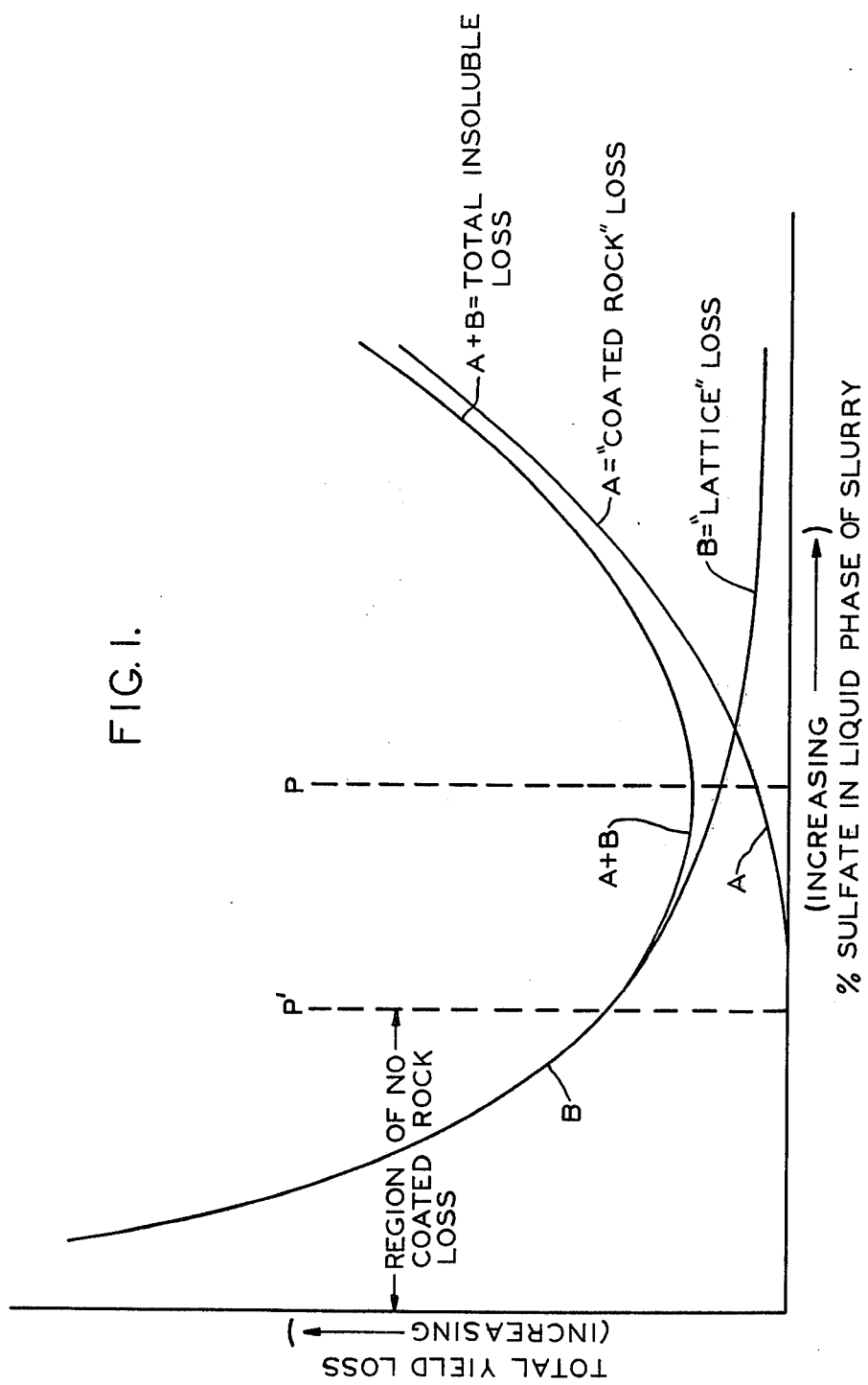
FIG. 1 is a graph showing the relationship between the percent sulfate in the liquid phase of the slurry and the coated rock and lattice losses.

The "controlled" sulfate concentration in the reactor means that conditions within the reactor are controlled so that the sulfate concentration is low enough, relative to the conditions in a given reactor, that coating or blinding of unreacted phosphate rock particles with calcium sulfate is substantially precluded.

The present invention comprises a novel, specified sequence of process steps which are characterized by the fact that coating of rock particles is substantially precluded in the reactor system, and the lattice losses sustained therein, and any soluble losses, are substantially entirely recovered by process steps carried out subsequent to the reactor. The result is an extremely high over-all phosphate recovery rate, and a substantially phosphate-free calcium sulfate by-product.

As will be recognized by those skilled in the art, a sulfate level in the reactor or attack vessel which will substantially preclude coating of the rock particles depends on the type of rock being reacted, the particle size of the rock, the mechanical arrangement of the reactor vessel, (including the physical points of addition of the rock and sulfuric acid, and the recycle phosphoric and sulfuric acids), recycle rates, the time sequence, if any, at which the reactants are introduced into the vessel, the hydrogen concentration of the liquid portion of the slurry (since this affects the solubility of the rock particles), and the concentration of impurities, such as silicates, in the slurry. Other things being equal, rock coating is avoided by a low sulfate concentration level, i.e., a level which does not exceed a given maximum level for the other conditions which obtain.

For example, a very reactive phosphate rock such as a ground, high-grade Moroccan rock could, under given conditions, be reacted in a reactor vessel with a sulfate concentration as high as 35 grams per liter without substantial blinding of the rock particles taking place. For a ground, high-grade Florida rock, a sulfate concentration as high as about 10 to 15 grams per liter could be sustained without blinding of rock particles. For a very refractory, non-reactive rock, even when ground to very fine particle size, such as a volcanic origin rock from South Africa (Phalamborwa), or Kola rock from Russia, it may be necessary to maintain a sulfate level as low as about 5 grams per liter or less in order to preclude substantial rock blinding. The foregoing values may of course vary depending on other factors, as discussed above. In any given case, all such factors must be taken into account to determine the sulfate level at which the reactor system can be operated without blinding or coating of the rock particles with calcium sulfate. In general, the more reactive a rock is the more quickly it dissolves and reacts, and the less susceptible it is to coating. Reactivity and rate of dissolution can be enhanced by grinding the rock to a fine particle size. As indicated above, the physical configuration of the reactor system and the manner in which the reactants are admixed will also affect the rate of reaction, and consequently affect "safe" maximum sulfate level in any given case. Given a specific plant, and operating procedures, and a specific rock feed, it is well within the abilities of anyone skilled in the art to operate the plant so as to preclude rock coating. It should be noted, as explained more fully hereinbelow, that operating the plant so as to virtually eliminate any rock coating, may not and probably will not be the most efficient mode of operation, under prior art practices.

In practice, phosphate rock, and recycled phosphoric and sulfuric acid, preferably supplemented with fresh sulfuric acid as required, is added to the reactor system vessel or vessels. The rock reacts with the acid in accordance with equations (1) through (3) above, resulting in a slurry of gypsum crystals suspended in an aqueous solution of phosphoric and sulfuric acids. The reactor system is operated at sulfate concentration levels which, considering the type of rock and other conditions as discussed above, are such that phosphate losses due to rock coating or blinding are substantially eliminated, although the lattice losses sustained may be very high. In fact, the lattice losses at this point may exceed the combined coating and lattice losses that would be sustained in an otherwise identical, conventionally operated reactor system. To illustrate, referring now to FIG. 1, there is shown a graph with the total insoluble phosphoric acid yield loss for a wet phosphoric acid manufacturing process shown on the ordinate or vertical axis of the graph, the yield loss increasing in moving in an upward direction along the ordinate. The sulfate concentration in the liquid portion of the slurry is shown on the abscissa or horizontal axis of the graph, the concentration increasing in moving from left to right along the abscissa.

The relationship between "coated rock" loss (curve A) and "lattice" loss (curve B) as a function of sulfate concentration is shown, with "total insoluble" loss (curve A + B) being the sum of the coated rock and lattice losses. While the entire set of curves may shift along either or both axes of the graph, or "stretch" along one or both axes, depending on the factors discussed above (rock particle size, reactivity, etc.), the qualitative relationship between the curves will generally hold constant. In conventional wet process phosphoric acid processes, the aim is to operate the phosphate rock reactor at a sulfate level shown as line P so as to minimize the total insoluble losses. In accordance with the present invention, the phosphate rock reactor is operated at or to the left of line P' so that coated rock losses are eliminated as more fully described hereinbelow.

In accordance with the present invention, the reactor system may be operated to produce a relatively high concentration of product phosphoric acid, by maintaining the system at a temperature of between about 60° C and 90° C. It is emphasized however, that the process of the invention is applicable to any reactor system and mode of operation. It is immaterial to the practice of the invention whether acid of conventional (30–33% $P_2O_5$) strength or a higher strength acid is made. However, production of concentrated acid is aided by the controlled sulfate concentration which is maintained, in accordance with the invention, in the liquid portion of the slurry.

The reaction of the phosphate rock to form phosphoric acid is an exothermic reaction, and reactor system temperature levels are maintained by cooling the reaction mixture. This may be done by known means, such as air blowing or vacuum evaporation. Phosphoric acid at a selected strength of between about 25% and 45% may be produced, and a filterable and washable form of gypsum may be obtained from the reactor system by suitably controlling the conditions therein.

As aforesaid, operation of the reactor system may be by any suitable method, to produce any desired strength of phosphoric acid product. The development of techniques for controlling the reactor system have been the subject of much prior art work, are well known, and therefore need not be discussed in detail here. It suffices to say that any methods or techniques to control the rock reactor system may be employed. Preferred methods of controlling the reactor system are shown, for example, in my U.S. Pat. Nos. 3,522,003 and 3,522,004.

The concentration of sulfate in the liquid portion of the slurry is low relative to conventional practice for equivalent conditions, and although this has the advantages noted above, it usually results in a higher than normal concentration of calcium ions in solution. If the product phosphoric acid is to be used as a liquid fertilizer (eg, reacted to form diammonium phosphate) the high calcium level causes undesirable precipitates to form. Therefore, in accordance with another aspect of the invention, a quantity of sulfuric acid may be added to the gypsum slurry withdrawn from the reactor system to precipitate calcium as calcium sulfate. The additional precipitation takes place on the large quantity of existing gypsum crystals present, so that the formation of excessive numbers of small crystals does not occur.

Since substantially all the phosphate rock has already been reacted at this point, the sulfuric acid addition serves merely to reduce the calcium level in the liquid, and not to react additional rock, so that there is no problem of rock particle coating.

From the reactor system, the gypsum slurry is then fed to a crystal-liquid separating means, preferably a rotary pan-dump vacuum filter or vacuum belt filter, as is well known in the art. Product phosphoric acid is separated from the filter and withdrawn as the phosphoric acid product of the process. The gypsum crystals remaining on the filter are wet with residual product phosphoric acid, and it is usual in the art to recover such residual product acid therefrom by washing the crystals with water.

In accordance with the present invention, this intermediate wash may be eliminated, since the residual phosphoric acid will be recovered at a later stage of the process and the somewhat increased phosphate concentration caused by the residual phosphoric acid entering the recrystallizers is not usually deleterious to the process. However, circumstances may warrant conducting the intermediate wash. For example, it may be desired to keep the intermediate gypsum crystals free of residual phosphoric acid to avoid contaminating final product gypsum crystals when a single "shared time" filter is used to filter both the intermediate and final product gypsum crystals. There may also be other reasons, in a given case, for minimizing the phosphoric acid content of the recrystallizers by washing of the intermediate gypsum crystals.

Therefore, in accordance with another aspect of the present invention, in order to limit the quantities of water introduced into the process when the intermediate wash is employed, a dilute sulfuric acid solution is used in place of water to wash the residual phosphoric acid from the gypsum crystals. This sulfuric acid solution is preferably obtained from a later stage in the process, as hereinafter explained, and the used wash acid solution, with its admixed residual phosphoric acid, is recycled to the reactor system.

The gypsum crystals, whether or not freed of surface residual phosphoric acid by the sulfuric acid wash, contain a considerable amount of lattice-entrapped phosphate values in the gypsum crystals. The gypsum filter cake is accordingly passed to a first re-crystallizer into which sulfuric acid is added. A sufficiently high combination of temperature and sulfuric acid concentration in the first recrystallizer is maintained so that the gypsum introduced therein is recrystallized to the hemihydrate form of calcium sulfate, with the result that the lattice-entrapped phosphate is released from the disintegrating gypsum crystals. The hemihydrate crystals, having quite different crystallographic factors from the gypsum crystals, do not, under the conditions prevailing in the first recrystallizer, incorporate into their lattice structure dicalcium phosphate or other phosphate compounds. Additionally, the concentration of phosphoric acid is low as compared to the sulfuric acid concentration, and the relatively high sulfuric acid concentration depresses the calcium level in the liquid portion of the slurry. As previously mentioned, lattice entrapment of phosphate does not appear to occur in hemihydrate crystals in solutions containing not more than 30–32% $P_2O_5$. Therefore, in order to preclude lattice entrapment of phosphates, the concentration of phosphoric acid in the first recrystallizer should be below 32% $P_2O_5$ (44% $H_3PO_4$). Normally, the phosphoric acid concentration is kept far below this value. For example, as shown below, in one example of the invention, the phosphoric acid concentration in the first recrystallizer is 2% (with intermediate crystal washing) and about 9% without intermediate crystal washing. The phosphoric acid concentration in the first recrystallizer should preferably be below about 30%, most preferably, below about 10%. The sulfuric acid concentration in the first recrystallizer will be high enough to maintain conditions in the hemihydrate phase for the temperature obtaining. Typical values for the required temperature and concentration ranges may be obtained from the graph of FIG. 2.

It should be noted that since the hemihydrate crystals of the present invention are not formed in the reactor system, hemihydrate crystal free of lattice-entrapped phosphates may be obtained regardless of how high a phosphoric acid concentration is maintained in the reactor system. The conversion from gypsum to hemihydrate is rapid under these recrystallization conditions, and is immediately triggered by the inventory of hemihydrate crystals in the recrystallizer, which serve as seed crystals for the recrystallization reaction.

The hemihydrate slurry, consisting of calcium sulfate hemihydrate crystals, a high concentration of sulfuric acid, and a low concentration of phosphoric acid (the latter obtained primarily from released lattice phosphate compounds), is then passed to a second recrystallizer, in which the mixture is diluted by the addition of water, preferably wash water obtained from a later stage of the process, as hereinafter described. The (wash) water also cools the mixture and the cooling effect of the added water may be supplemented with blow air or cooling of any type known in the art. The sulfate concentration level and temperature are thus immediately reduced to levels at which the calcium sulfate hemihydrate recrystallizes to gypsum. The reaction is rapid and the inventory of gypsum in the second recrystallizer serves as seed crystals for the recrystallization reaction.

Figure 2:
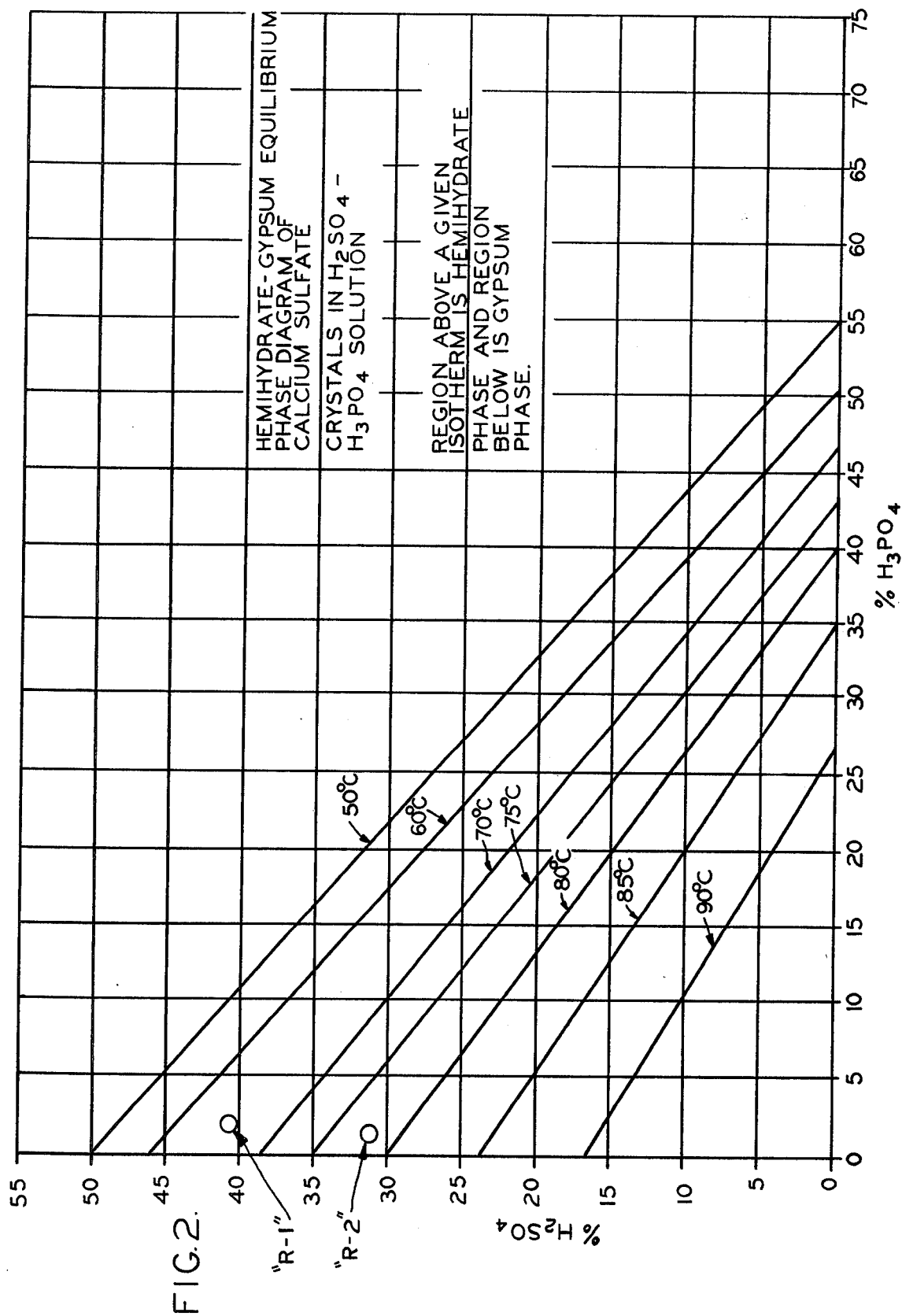
FIG. 2 is a graph showing gypsum-hemihydrate phases for various concentrations of phosphoric acid plotted against various concentrations of sulfuric acid with gypsum-hemihydrate equilibrium phase lines at various temperatures.

Referring now to FIG. 2, the portion of the graph below a given isotherm or constant temperature line is the gypsum phase and the portion above the isotherm is the hemihydrate phase. As shown, decreasing temperature and decreasing sulfuric acid concentration favor gypsum formation, and relatively modest changes in acid concentration and temperature will shift conditions from one phase to the other. The phase lines are equilibrium lines between the two phases and are representative only. That is, the lines will shift depending on impurities in the solution, which means that different sources of phosphate rock will show different locations for the equilibrium phase lines.

Since the liquid portion of the slurry entering the second recrystallizer has a high sulfate concentration, and a low phosphate ion concentration, the lattice entrapment of phosphate values in the recrystallized gypsum is very small, and a substantially phosphate-free gypsum crystal lattice is produced. The gypsum slurry from the second recrystallizer is then passed to a second crystalliquid separator, preferably a pan or belt filter similar to the first separator. Preferably at least a portion of the dilute sulfuric acid liquid initially separated from the gypsum crystals so obtained is returned to the first filter, for use as the dilute sulfuric acid wash liquid. A portion of the second separator liquid is also diverted to the first recrystallizer to supplement and dilute the concentrated sulfuric acid added thereto and to control the solids content thereof. The sulfuric acid-wetted gypsum crystals are then washed with water to produce a high purity gypsum crystal free both of lattice phosphates and surface phosphoric and sulfuric acids, which is withdrawn as a saleable by-product suitable for use in cement, wall board or other construction materials.

The wash water containing the residual washed acid may be recycled to the process as the cooling, diluent water added to the second recrystallizer.

It is thus seen that the process of the invention avoids many of the problems associated with prior art recrystallization processes. Calcium sulfate hemihydrate is not filtered at any point in the process, and the inherent difficulties of filering the unstable hemihydrate are avoided. Rigorous control to maintain a relatively stable hemihydrate crystal is not necessary, since the hemihydrate once formed is recrystallized to gypsum in the very next step of the process. The existing inventory of crystals in, respectively, the first and second re-crystallizers provide seed starter crystals for the recrystallization steps, and the preparation and maintenance of separate seed crystal inventories is not necessary during operation of the process.

The process of the invention eliminates coated rock losses, and places all the rock into solution by reacting the phosphate rock in a controlled sulfate environment such that virtually no coating occurs, and then recovers the attendant lattice losses by recrystallizing the gypsum thus produced to hemihydrate. The necessity of handling or filtering hemihydrate crystals is avoided by immediately recrystallizing the hemihydrate to gypsum in a relatively high sulfate, low phosphate environment which results in virtual elimination of phosphate lattice losses. Any desired concentration phosphoric acid product may be obtained, and a high purity of by-product gypsum is also obtained, not only because of the conditions maintained and the sequence of reaction, crystallization and recrystallization steps, but because the totality of wash water introduced into the system is introduced onto the finished gypsum by-product crystals. In this manner, all the wash water is employed on the product crystals and none is expended on interim process crystals.

Figure 3:
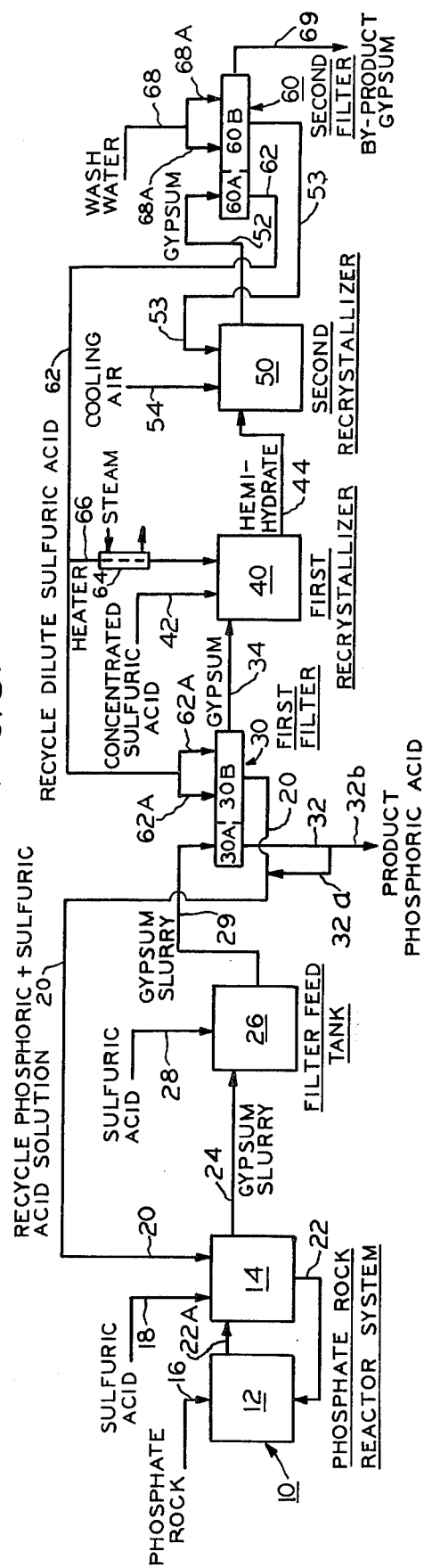
FIG. 3 is a schematic flow sheet illustrating an embodiment of the invention.

Referring now to FIG. 3 of the drawings, 10 shows generally the phosphate rock reactor system which typically comprises two or more vessels 12 and 14 into which phosphate rock, sulfuric acid and recycled phosphoric and sulfuric acid are introduced by, respectively, lines 16, 18 and 20. The conditions in the reactor system are maintained so that gypsum calcium sulfate crystals are obtained. Phosphoric acid of desired strength may be obtained, as is well known in the art, by suitably controlling the reactor system. A high strength acid of between 35% and 45% $P_2O_5$ may be obtained, or a more conventional acid strength of 30% up to 35% $P_2O_5$ may be obtained. In general, a product acid strength of between 25% to 45% $P_2O_5$ may be obtained. The reaction slurry is shown as being recirculated through the phosphate rock reactor system, as is conventional practice, via recirculation lines 22, 22A. The phosphate rock may be ground to a specified fineness before being introduced into the phosphate rock reactor system. This and other details of the phosphate rock reactor system, being well known in the art, are not shown. Any suitable phosphate rock reactor system may be used.

A portion of the gypsum slurry is withdrawn from phosphate rock reactor system 10 via line 24 and passed to a filter feed tank 26. Sulfuric acid may be added via line 28 to adjust the sulfate concentration of the liquid portion of the slurry upwardly. This precipitates calcium ions in the liquid portion of the slurry, the calcium sulfate precipitating onto the existing gypsum crystals. The slurry withdrawn via line 24 contains no unreacted phosphate rock since the sulfate levels maintained in the phosphate rock reactor system are low enough to preclude coating or blinding of the rock particles with calcium sulfate, and insure complete reaction of the rock.

The sulfate level-adjusted gypsum slurry is passed from filter feed tank 26 via line 29 to a first filter 30. Filter 30 may be of any suitable type. In the wet process phosphoric art a horizontal table vacuum filter consisting of a plurality of wedge-shaped pans is frequently employed. The slurry is dumped onto a section of the rotating filter and a vacuum is applied thereto, which suctions the liquid portion of the slurry through the filter cloth medium and leaves behind a gypsum filter cake. The phosphoric acid separated in this first suction section of the filter is withdrawn via line 32. A portion of this acid may be recycled to the reactor system via line 32a, and the remainder is withdrawn as product phosphoric acid via line 32b. The filter cake on first filter 30 is then washed in the wash section of the filter with a dilute sulfuric acid wash solution obtained from second filter 60 as described hereinbelow. First filter 30 is shown as divided into a suction section 30A and a wash section 30B. The dilute sulfuric acid wash solution is introduced onto wash section 30B of first filter 30 via line 62 and passed therethrough as indicated schematically by the arrows 62A. The sulfuric acid solution washes residual phosphoric acid from the gypsum crystals, and the used wash acid, containing the removed residual phosphoric acid, is recycled via line 20 to phosphate rock reactor system 10.

The acid washed gypsum crystals, containing entrapped phosphate values within the gypsum crystal lattice and any residual surface phosphoric acid not removed by the sulfuric acid wash, is dumped from the filter and passed via line 34 to first recrystallizer 40. It will be appreciated that although in the usual case the sulfuric acid wash of the gypsum crystals obtained from the reactor will remove most of the residual phosphoric acid wetting the crystal surfaces, the process is so designed that if washing difficulties should be experienced, the residual phosphoric acid not washed from the crystals is recovered, along with the lattice-entrapped phosphate values, at a later stage of the process. Concentrated sulfuric acid is introduced into first recrystallizer 40 via line 42. First recrystallizer 40 is heated to raise the temperature to that at which recrystallization from gypsum to hemihydrate will occur. As shown, the heat of dilution of the added sulfuric acid may be supplemented by heating that portion of the liquid filtrate obtained from second filter 60 which is diverted via line 66 to first recrystallizer 40. Heat exchanger 64 may be used for this purpose. Naturally, any other suitable means may be employed to heat recrystallizer 40.

It will be appreciated that in operation, there is at all times an inventory of hemihydrate crystal slurry in first recrystallizer 40. Accordingly, the gypsum crystals introduced thereto find a large quantity of hemihydrate "seed" crystals, and under the prevailing conditions of temperature and concentration the gypsum crystals rapidly recrystallize to hemihydrate form. As the gypsum recrystallizes to the hemihydrate form in first recrystallizer 40, the entrapped phosphate values contained within the calcium sulfate gypsum crystals are released and enter the liquid phase. They are not retrapped in the hemihydrate crystals because, as set forth hereinabove, the hemihydrate crystal is unable to contain the phosphate ion within its lattice structure.

The hemihydrate thus formed is withdrawn from first recrystallizer 40 via line 44 and passed to second recrystallizer 50. Used wash water obtained from second filter 60 is introduced into second recrystallizer 50 via line 53. If additional cooling is needed, air for cooling may be introduced via line 54 as shown, or any other suitable cooling method such as evaporative cooling, may be employed to cool the material in recrystallizer 50. The lower temperature and lower sulfuric acid concentration in second recrystallizer 50, and the inventory of gypsum seed crystals therein, rapidly convert the hemihydrate crystals back to the gypsum form.

The recrystallization to the gypsum form takes place in the low phosphate, relatively high sulfate content environment obtaining in second recrystallizer 50. The liquid entering recrystallizer 50 consists of the sulfuric acid liquid portion of the hemihydrate slurry and wash water from second filter 60. The only phosphate values entering crystallizer 50 are those contained on or entrapped within the gypsum crystals recovered from filter 30. The recrystallization of gypsum in second recrystallizer 50 thus takes place under conditions in which entrapment of phosphate values within the crystals is virtually nil. The recrystallized, practically phosphate-free gypsum is then passed via line 52 to second filter 60, which, like first filter 30 is divided into a suction section 60A and a wash section 60B. On second filter 60, a filtrate is separated in suction Section 60A. This filtrate comprises the dilute sulfuric acid solution removed via line 62, a portion of which is recycled to first filter 30 and a second portion of which is recycled to first recrystallizer 40. Wash water is introduced via line 68, onto wash section 60B of second filter 60. Residual sulfuric acid on the surface of the gypsum crystals forming the filter cake on second filter 60 is removed by the wash water which passes through the filter, as indicated by the arrows 68A. The used wash water, together with its residual sulfuric acid content is recycled to the process by being introduced via line 53 into second recrystallizer 50, wherein it serves to cool and dilute the slurry contained therein so as to help provide the requisite gypsum recrystallization conditions.

High purity by-product gypsum is removed from second filter 60 via line 69.

Figure 4:
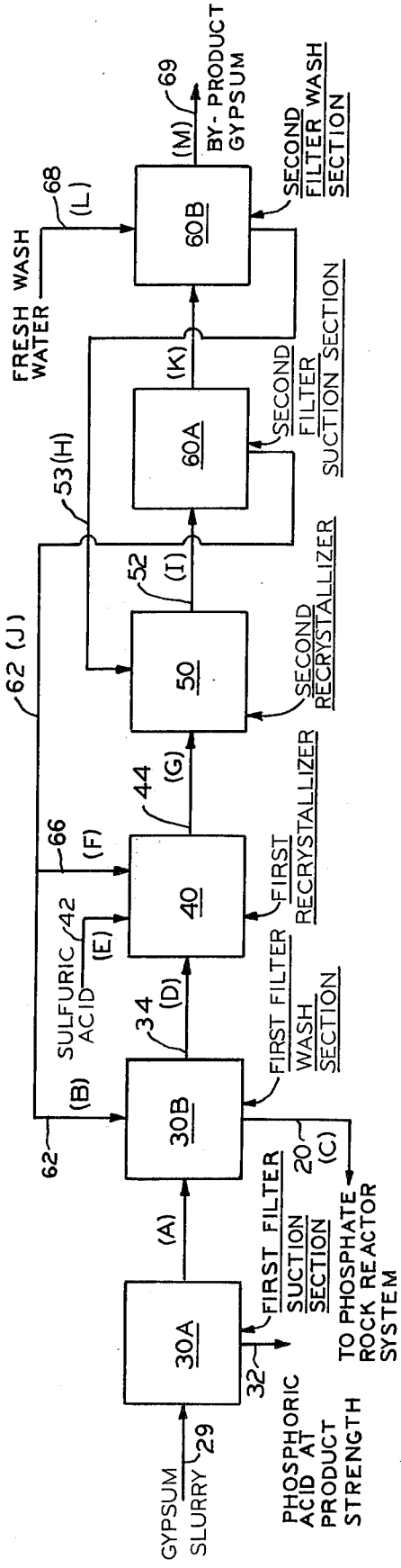
FIG. 4 is a schematic flow sheet showing a section of the process of FIG. 3, and is keyed to the data of Table I.

Referring now to FIG. 4, a portion of the flow sheet of FIG. 3 is shown in greater detail. Identical parts have the same designating numerals as shown in FIG. 3, and the line-designating numerals are supplemented with letter designators (A) through (M), which are keyed to Table I below. FIG. 4 also shows the suction and wash sections of the filters 30 and 60 separately, so that the composition of the gypsum being transferred from the suction to the wash section of each filter may be indicated. It will be appreciated that in the usual case, the filter is physically a single entity with individual filter pans being sequentially rotated through suction and wash sections. The various constituents of the process streams are shown in Table I, and are typical of the conditions which would be found in a plant operated in accordance with the invention.

The "gypsum" and "dicalcium" are shown on separate lines in Table I, but it will be understood that physically the dicalcium phosphate is entrapped within the lattice of the gypsum crystals. Also, for simplicity, no sulfuric acid is shown as such in line (A), although it is reasonably certain that there will be some present, not all of the "sulfate" being present as dissolved calcium sulfate. Further, the table reflects perfect displacement washing on filter 30. Naturally, perfect washing will not be attained in practice, but such soluble losses as are incurred will be recovered by recycling liquids from second filter 60 back into the process.

TABLE I

Quantity in Tons
Line in FIG. 4

| Component | (A) | (B) | (C) | (D) | (E) | (F) | (G) |
|---|---|---|---|---|---|---|---|
| Gypsum | 4.979 | 0 | 0 | 4.979 | 0 | 0 | 0 |
| (a) Dicalcium | 0.121 | 0 | 0 | 0.121 | 0 | 0 | 0 |
| Hemihydrate | 0 | 0 | 0 | 0 | 0 | 0 | 4.300 |
| $H_3PO_4$ | 0.750 | 0.095 | 0.819 | 0.026 | 0 | 0.040 | 0.135 |
| $H_2SO_4$ | 0 | 1.905 | 1.381 | 0.524 | 1.450 | 0.805 | 2.710 |
| $H_2O$ | 0.950 | 4.150 | 3.950 | 1.150 | 0.110 | 1.755 | 3.815 |
| TOTAL | 6.800 | 6.150 | 6.150 | 6.800 | 1.560 | 2.600 | 10.960 |

Percent by Weight
Line in FIG. 4

TABLE I-continued

| Component | (A) | (B) | (C) | (D) | (E) | (F) | (G) |
|---|---|---|---|---|---|---|---|
| (b) $H_3PO_4$ | 44.2 | 1.5 | 13.3 | 1.5 | 0 | 1.5 | 2.0 |
| (b) $H_2SO_4$ | 0 | 31.0 | 22.5 | 31.0 | 93.0 | 31.0 | 40.7 |
| (b) $H_2O$ | 55.8 | 67.5 | 64.2 | 67.5 | 7.0 | 67.5 | 57.5 |
| (c) Solids | 75.0 | 0 | 0 | 75.0 | 0 | 0 | 39.3 |

Quantity in Tons
Line in FIG. 4

| Component | (H) | (I) | (J) | (K) | (L) | (M) |
|---|---|---|---|---|---|---|
| Gypsum | 0 | 5.100 | 0 | 5.100 | 0 | 5.100 |
| (a) Dicalcium | 0 | 0 | 0 | 0 | 0 | 0 |
| Hemihydrate | 0 | 0 | 0 | 0 | 0 | 0 |
| $H_3PO_4$ | 0.026 | 0.161 | 0.135 | 0.026 | 0 | 0 |
| $H_2SO_4$ | 0.524 | 3.234 | 2.710 | 0.524 | 0 | 0 |
| $H_2O$ | 4.040 | 7.055 | 5.905 | 1.150 | 4.590 | 1.700 |
| TOTAL | 4.590 | 15.550 | 8.750 | 6.800 | 4.590 | 6.800 |

Percent By Weight
Line in FIG. 4

| Component | (H) | (I) | (J) | (K) | (L) | (M) |
|---|---|---|---|---|---|---|
| (b) $H_3PO_4$ | 0.5 | 1.5 | 1.5 | 1.5 | 0 | 0 |
| (b) $H_2SO_4$ | 11.5 | 31.0 | 31.0 | 31.0 | 0 | 0 |
| (b) $H_2O$ | 88.0 | 67.5 | 67.5 | 67.5 | 100.0 | 100.0 |
| (c) Solids | 0 | 32.8 | 0 | 75.0 | 0 | 75.0 |

(a) dicalcium phosphate "trapped" as lattice loss in gypsum crystals
(b) % by wt. of liquid portion of slurry.
(c) % by wt. of total slurry, liquid and solids.

Referring again to FIG. 2, the sulfuric and phosphoric acid concentrations prevailing in, respectively, first recrystallizer 40 (Column G in Table I) and second recrystallizer 50 (Column I, in Table I) are shown thereon as points "R-1" and "R-2". In order for gypsum to recrystallize to hemihydrate in first recrystallizer 40, it is seen, by interpolating between the 60° C and 70° C isotherms, that the temperature in first recrystallizer 40 must be above about 64° C to drive the recrystallization reaction. Similarly, the temperature in second recrystallizer 50 must be below about 78° C to drive the recrystallization reaction to gypsum.

It will be noted that the effect of reducing the sulfuric acid concentration in second recrystallizer 50 is such that the temperature therein is not necessarily lower than that in first recrystallizer 40, although usually it will be. Under given conditions, the temperature in the second (hemihydrate to gypsum) recrystallizer may be greater than, about the same as, or even lower than that in the first (gypsum to hemihydrate) recrystallizer.

The "93%" sulfuric acid shown as being introduced via line 42 (Column E, Table I) into first recrystallizer 40 is conviently the commercially available 92.8% sulfuric acid. A concentration strength of "about 93%" sulfuric acid shall mean and include the commercially available 92.8% acid.

If the process exemplified in Table I and FIGS. 3 and 4 is modified by eliminating the sulfuric acid washing of the "intermediate" gypsum crystals, i.e., those separated on first filter 30 (in which case the sulfuric acid in line 62 would be passed directly to vessel 14), the concentration of phosphoric acid in second recrystallizer 50 would increase from the 1.5% shown in Table I to about 9%. (The increase represents the residual phosphoric acid clinging to the surface of the intermediate gypsum crystals.) Even at 9% phosphoric acid in the liquid of the slurry in second recrystallizer 50, there will be virtually no entrapment of phosphate values ("lattice" loss) within the gypsum crystals formed therein. Since the liquid portion of this slurry is separated on second filter 60 and returned to the process via line 62 whether or not the intermediate gypsum crystals are washed, the phosphate values contained in the liquid are recovered.

In accordance with the foregoing, it is seen that the invention provides a novel and efficient process for the manufacture of phosphoric acid by the wet process method, which process yields a high purity gypsum by-product, provides practically complete recovery of phosphate values, and which may be operated with any type of phosphate rock attack system, regardless of the type of product phosphoric acid (eg, conventional or high strength acid) being produced. The process of the invention avoids the necessity of filtering hemihydrate crystals with its attendant difficulties, and does not require a separate inventory of seed crystals to be maintained. All of the wash water introduced into the process is used to wash the final product crystals thus enhancing by-product purity.

It will be apparent to those skilled in the art, after reading and understanding the foregoing description, that numerous modifications and alterations may be made to the specific embodiments described, which alterations and modifications are, however, within the scope of the appended claims. For example, although the preferred embodiment shows separate first and second filters, a single "shared-time filter" may be substituted for the two filters. This is simply a single, large capacity filter, a portion of which would be used to carry out the function of the first filter, and another portion of which would be used to carry out the function of the second filter.

As will also be apparent to those skilled in the art, numerous valves, control devices, pumps, etc. have been omitted from the description and the Figures for the sake of brevity and clarity, the location and use of such devices being well known to those skilled in the art.

What is claimed is:

1. A method for producing phosphoric acid and high purity gypsum comprising:
    a. introducing calcium phosphate rock, phosphoric acid and sulfuric acid into a reaction system;
    b. reacting in said reaction system substantially all of said calcium phosphate rock to form a first slurry of phosphate-containing gypsum calcium sulfate in a first liquid comprising phosphoric acid having a concentration of at least 25 percent;
    c. withdrawing a portion of said first slurry from said reaction system and separating phosphoric acid product having a concentration of at least 25 percent therefrom;
    d. recrystallizing phosphate-containing gypsum calcium sulfate contained in the withdrawn portion in a second liquid comprising phosphoric acid having a concentration of less than about 10 percent and sulfuric acid to form a second slurry of calcium sulfate hemihydrate;
    e. recrystallizing said calcium sulfate hemihydrate in a third liquid comprising phosphoric acid having a concentration of less than 10 percent to form a third slurry of high purity gypsum; and
    f. separating said high purity gypsum as a product of the process.

2. The method of claim 1 wherein a filtrate is recovered from the third slurry and at least a portion thereof is added to said second liquid.

3. The method of claim 1 wherein said high purity gypsum separated from said third slurry is washed with water.

4. The method of claim 3 wherein wash water is recovered and added to said third liquid.

* * * * *